US005256848A

United States Patent [19]

Cartry et al.

[11] Patent Number: 5,256,848

[45] Date of Patent: Oct. 26, 1993

[54] APPARATUS FOR WORKING BY LASSER, ESPECIALLY FOR THE DECONTAMINATION OF A PIPE OF A NUCLEAR REACTOR

[75] Inventors: Jean-Pierre Cartry; Georges Clar, both of Lyon; Alain Martin, Caluire, all of France

[73] Assignee: Framatome, Courbevoie, France

[21] Appl. No.: 758,102

[22] Filed: Sep. 12, 1991

[30] Foreign Application Priority Data

Sep. 12, 1990 [FR] France ........................ 90 11281

[51] Int. Cl.[5] .............................. B23K 26/00

[52] U.S. Cl. .................... 219/121.6; 376/310

[58] Field of Search .................. 219/121.6, 121.85; 376/309, 310

[56] References Cited

U.S. PATENT DOCUMENTS 4,657,596 4/1987 Murray et al. .................. 376/309 X
4,704,235 11/1987 Arvesen .......................... 376/310 X
5,045,273 9/1991 Gassen et al. .................. 376/309 X

*Primary Examiner*—C. L. Albritton
*Attorney, Agent, or Firm*—Pollock, Vande Sande & Priddy

[57] ABSTRACT

Apparatus for working by laser, especially for the decontamination of a pipe of a nuclear reactor, comprising a laser source (18); an optical fiber (21) whose input is connected to the output of the laser source; a laser beam amplifier (20) whose input is connected to the output of the optical fiber; and a device (5) for transporting the laser beam emitted by the amplifier through the air to a working point.

7 Claims, 2 Drawing Sheets

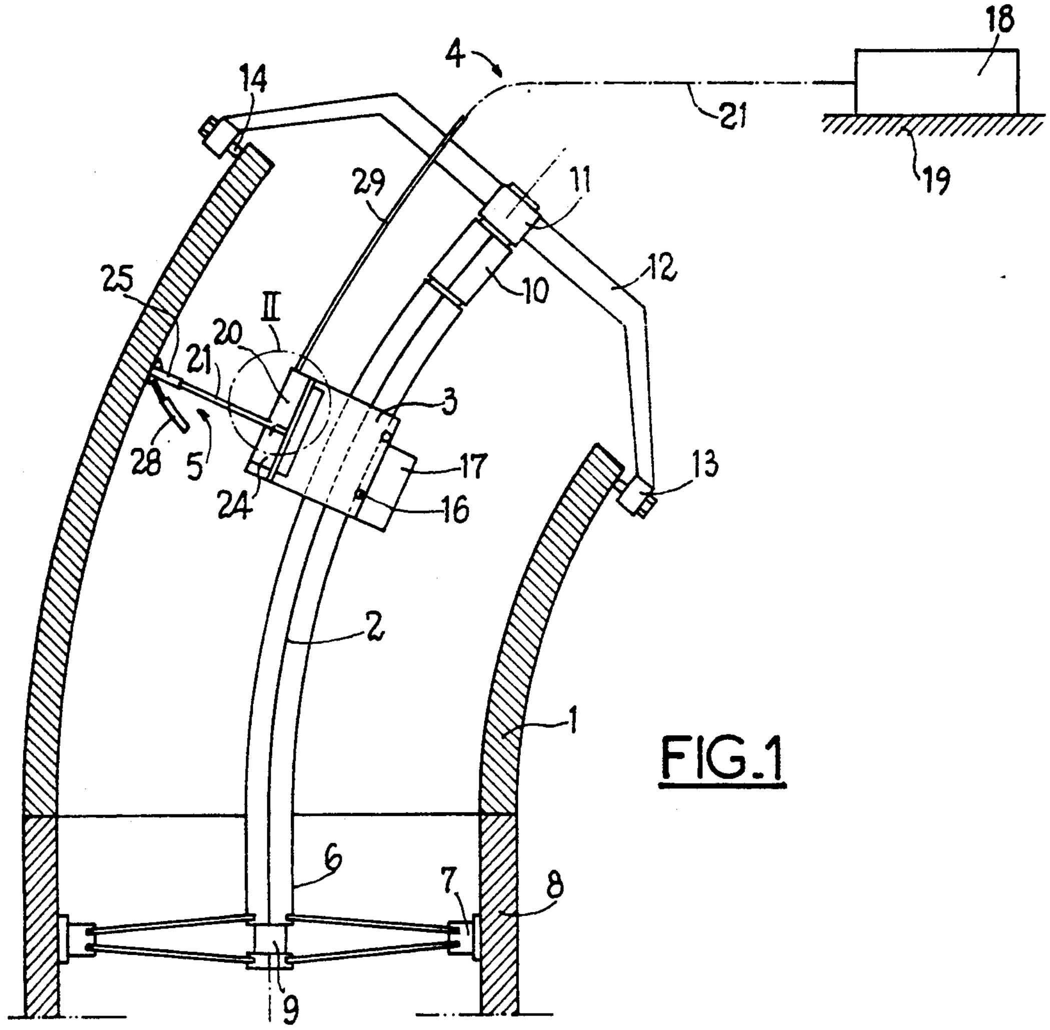
FIG.1
FIG.2
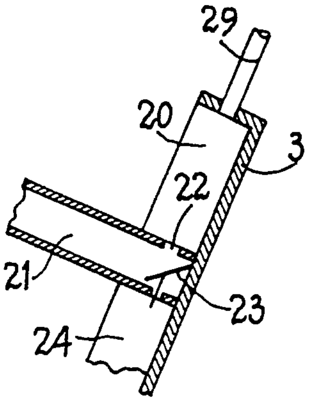

APPARATUS FOR WORKING BY LASSER, ESPECIALLY FOR THE DECONTAMINATION OF A PIPE OF A NUCLEAR REACTOR

FIELD OF THE INVENTION

The present invention relates to an apparatus for working by laser and intended to transmit a high power laser beam to working points difficult to access. The invention is applicable in particular to the decontamination by laser beam of a pipe or the like forming part of the primary water circuit of a steam generator of a nuclear power station of the pressurized water type, or of the water box of such a steam generator.

BACKGROUND OF THE INVENTION

It is difficult to transport a laser beam through the air to working points situated in pipes, especially bent ones, and the laser sources are usually too bulky to be themselves inserted into these pipes. It is known to utilize optical fibers for transporting laser beams, but the power which these fibres can transport is too limited for certain applications such as decontamination by laser beam.

SUMMARY OF THE INVENTION

It is an object of the invention is to provide an apparatus making it possible to transport easily high laser powers to working points difficult to access.

For this purpose, the subject of the invention is an apparatus for working by laser, comprising:

- a laser source;
- an optical fiber whose input is connected to the output of the laser source;
- a laser beam amplifier whose input is connected to the output of the optical fiber; and
- means for transporting the laser beam emitted by the amplifier through the air to a working point.

According to other characteristics of the invention:

- the apparatus, when it is intended to carry out work on the inside of a pipe or the like, comprises a support rail equipped with mounting means in the pipe substantially along the axis of the latter and a carriage movably mounted on this rail, the amplifier being carried by the carriage and the transport means comprising means for sweeping by the laser beam of a region of the internal wall of the pipe;
- the rail comprises a rotary indexing section and the sweeping means are adapted to sweep, in a radial plane, an angular sector of the internal wall;
- the rail has a polygonal cross-section of n sides, the rotary indexing section being adapted to turn in steps of 360/n degrees;
- the scanning means comprise an oscillating guide-tube through which the amplified laser beam passes and a reflecting mirror fixed to the base of this tube;
- a suction nozzle is mounted at the end of the guide-tube; and
- the apparatus comprises means for elastic application of the suction nozzle onto the internal wall.

BRIEF DESCRIPTION OF THE DRAWINGS

An embodiment of the invention will now be described with reference to the attached drawings, in which:

FIG. 1 is an overall view of an apparatus according to the invention, which apparatus is disposed in a pipe elbow, the view being a cross-section taken along the axis of the pipe;

FIG. 2 shows the detail II of FIG. 1 on a larger scale and in partial cross-section;

DESCRIPTION OF PREFERRED EMBODIMENT

Figure 4:
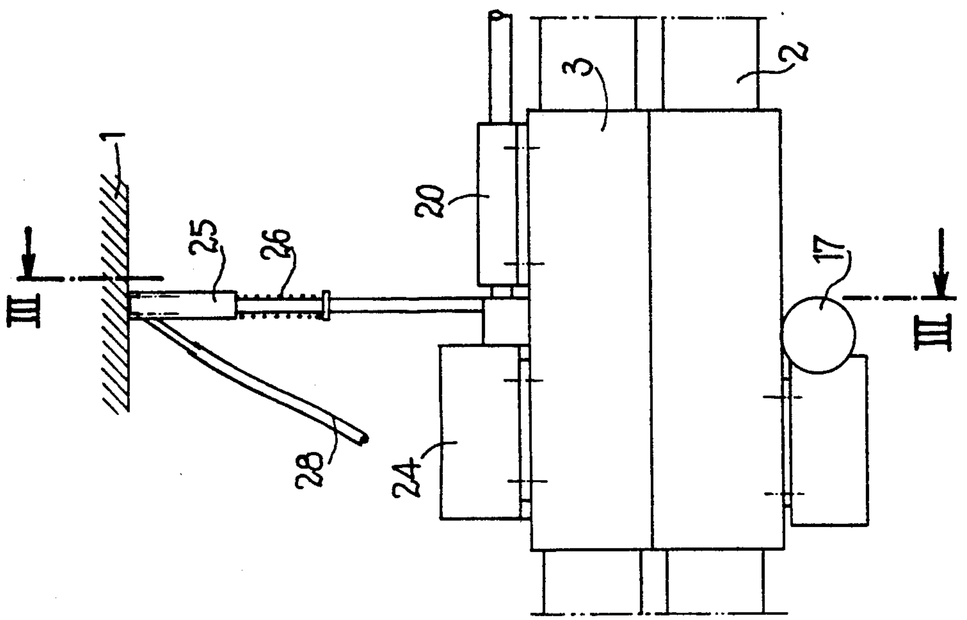
FIG. 4 is a view in the direction of arrow IV of FIG. 3.

The apparatus shown in the drawings is intended to carry out the decontamination of a pipe section 1 of relatively large diameter which is part of the primary water circuit of a steam generator of a pressurized water nuclear reactor. In the example shown, this is a pipe elbow section.

The apparatus consists essentially of a support rail 2, a carriage 3 movably mounted on this rail, a device 4 for producing a high power laser beam and a device 5 for transporting this beam through the air to the internal wall of the section 1.

The rail 2 is of hexagonal cross-section (FIG. 3), has a curved shape and in service its longitudinal axis is coincident with that of the section 1. It comprises a rectilinear extension 6 equipped with a centering device 7 in the pipe section 8 adjacent to the section 1, this centering device being expandable by means of a jack 9 provided at the end of the extension 6. Rail 2 is extended by an indexer 10 which is a rail section of the same hexagonal cross-section as the rail 2 and which may be turned about its axis in steps of 60° by means of a motor (not shown) housed in the rail. The indexer 10 turns on a shaft integral with the rail 2, which shaft carries at its free end the hub 11 of a cross-member 12, which in turn carries a centering ring 13. By actuating several jacks 14 mounted radially on this ring, the axis of the rail 2 may be aligned sufficiently accurately with that of the elbow section 1.

Figure 3:
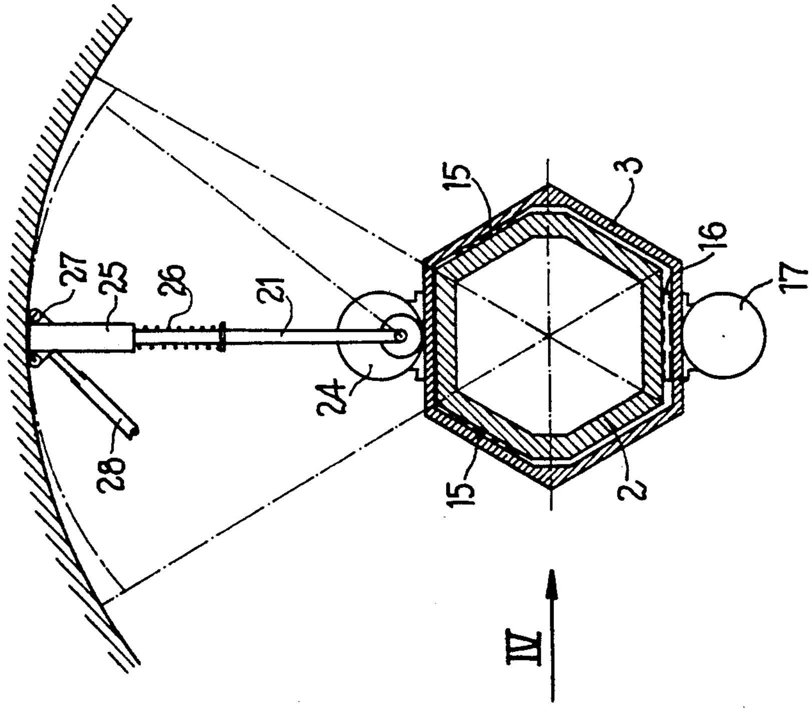
FIG. 3 is a view of the apparatus in cross-section taken along the line III—III of FIG. 4.

As shown in FIG. 3, the carriage 3 has a hexagonal cross-section homothetic with that of the rail 2, and between them are interposed two pairs of idler rollers 15, and one pair of driving-rollers 16 driven by a gear motor 17. The carriage may thus be brought to any point along the length of the rail 2 or on one of the extensions 6 and 10 of the latter.

The device 4 for producing the laser beam consists of a laser source 18 of the pulsed YAG type mounted on a fixed support 19 on the outside of the pipe to be treated and equipped with suitable supply, control and cooling means, and of a laser beam amplifier 20 fixed on the carriage 3. The output of the source 18 is connected to the input of an optical fiber 21 whose output is connected to the input of the amplifier 20. The latter is adapted to provide at its output a parallel amplified beam. By way of numerical example, the optical fiber may be adapted to transport a maximum power of 20 MW, the source 18 providing a peak power of this order and the amplifier 20 having an amplification factor of 5, which makes it possible to obtain at the output of this amplifier a laser beam having a peak power of the order of 100 MW, suitable for this application.

The device 5 for transporting the laser beam through the air comprises a guide-tube 21 whose base (FIG. 2) has an entrance hole 22 for the amplified laser beam facing the output of the amplifier 20. A reflecting mirror 23 inclined at 45° is fixed in the guide-tube facing the hole 22. The guide-tube and mirror assembly may be driven in an alternating angular movement in a radial plane by means of a motor 24 carried by the carriage 3.

A suction nozzle 25 is slidably mounted at the free end of the guide-tube 21 and is pressed against the internal wall of the pipe by means of a spring 26. The pressure of this nozzle on the pipe is effected by means of a floating tubular end-piece 27 equipped with bearing rollers. A flexible pipe 28 connects the nozzle 25 to a pump (not shown). If the products sucked up can be expelled into the pipe itself, this pump may be fixed onto the carriage 3. If this is not the case, the pump is mounted on a fixed unit on the outside of the pipe to be treated.

A flexible umbilical means 29 brings up to the carriage 3 the optical fiber 21, the electrical supply leads for the motors 17 and 24 and the amplifier 20, and, optionally, pipework (not shown) conveying the water for cooling the mirror and the amplifier, and the flexible piping 28.

While operating, at each position of the carriage 3 along the rail 2, the motor 24 drives the guide-tube 21 to and fro in such a manner that the end-piece 27 is displaced on the internal wall of the section 1 along a circular arc of amplitude substantially greater than 60°, and the device 4 for producing the laser beam is switched on. The amplified laser beam strikes the wall after reflection at the mirror 23 and ensures the decontamination of the point of impact and thus of the entire circular arc swept. After each round trip of the guide-tube, the carriage is advanced on the rail 2 by a step which is a function of the radius of the focal spot of the laser beam, such that an entire sector, greater than 60°, of the section 1 is decontaminated.

The carriage is then brought to the indexer 10 and the latter is turned through 60°, which brings the carriage 3 into a new angular position, and the decontamination of the next sector of the section 1 is carried out as described hereinabove, with an overlap of the preceding sector.

It is to be noted that the apparatus may be utilized whatever the shape and orientation in space of the pipe to be treated. In addition, by virtue of the utilization of a parallel laser beam, the distance between the mirror 23 and the wall of the pipe does not have to be adjusted very accurately.

We claim:

1. Apparatus for working by laser, especially for the decontamination of the internal wall of a pipe of a steam generator of a nuclear power station, said apparatus comprising (a) a laser source (18);

(b) an optical fiber having an input connected to an output of said laser source;

(c) a laser beam amplifier (20) having an input connected to an output of said optical fiber; and (d) means for transporting a laser beam emitted by said amplifier through air to a working point.

2. Apparatus according to claim 1, intended to carry out work on an inside of a pipe, said apparatus comprising a support rail (2) equipped with mounting means (7, 9, 11 to 14) in said pipe (1) substantially along an axis of said pipe, and a carriage (3) movably mounted on said support rail, said amplifier (20) being carried by said carriage and said transport means (5) comprising means (21 to 24) for sweeping by said laser beam of a region of the internal wall of said pipe (1).

3. Apparatus according to claim 2, wherein said rail (2) comprises a rotary indexing section (10) and said sweeping means (21 to 24) are adapted to sweep, in a radial plane, an angular sector of said internal wall.

4. Apparatus according to claim 3, wherein said rail (2) has a polygonal cross-section of n sides, said rotary indexing section (10) being adapted to turn in steps of 360/n degrees.

5. Apparatus according to any one of claims 2 to 4, wherein said sweeping means (21 to 24) comprise an oscillating guide-tube (21) through which the amplified laser beam passes and a reflecting mirror (23) fixed to a base of said guide-tube.

6. Apparatus according to claim 5, comprising a suction nozzle (25) mounted at an end of said guide-tube (21).

7. Apparatus according to claim 6, comprising means (26, 27) for elastic application of said suction nozzle (25) onto said internal wall.

* * * * *

UNITED STATES PATENT AND TRADEMARK OFFICE

CERTIFICATE OF CORRECTION

PATENT NO. : 5,256,848

DATED : October 26, 1993

INVENTOR(S) : Cartry et al

It is certified that error appears in the above-identified patent and that said Letters Patent is hereby corrected as shown below:

On title page, item [54] and col. 1, line 1,

In the title, change"LASSER" to --LASER--.

Signed and Sealed this

Third Day of May, 1994

Attest:

Bruce Lehman

BRUCE LEHMAN

*Attesting Officer*

*Commissioner of Patents and Trademarks*